(12) United States Patent
Fulmer

(10) Patent No.: US 6,321,689 B1
(45) Date of Patent: Nov. 27, 2001

(54) ANIMAL RESCUE DEVICE FOR SWIMMING POOLS

(76) Inventor: Philip E. Fulmer, 3312 E. Hayes Rd., Norristown, PA (US) 19401

( * ) Notice: Subject to any disclaimer, the term of this patent is extended or adjusted under 35 U.S.C. 154(b) by 0 days.

(21) Appl. No.: 09/271,358

(22) Filed: Mar. 17, 1999

(51) Int. Cl.[7] .............................. A01K 15/02; E04H 4/06; E04H 4/14; B63C 9/00
(52) U.S. Cl. ....................... 119/706; 119/849; 119/174; 4/496; 4/504; 441/80; 441/83
(58) Field of Search ..................... 119/706, 849, 119/174; 4/496, 504, 503, 502, 505; 441/80, 83, 84

(56) References Cited

U.S. PATENT DOCUMENTS

| 600,355 | * | 3/1898 | Burton | 441/80 |
|---|---|---|---|---|
| 4,369,109 | * | 1/1983 | Edge | 210/169 |
| 4,557,001 | * | 12/1985 | Burkhart | 4/490 |
| 4,658,449 | | 4/1987 | Martin | 4/496 |
| 4,837,869 | | 6/1989 | Simmon | 4/496 |
| 4,893,363 | | 1/1990 | Huff | 4/496 |
| 5,158,489 | * | 10/1992 | Araki et al. | 441/80 |
| 5,320,566 | * | 6/1994 | Low, Jr. | 441/80 |
| 5,370,565 | * | 12/1994 | Yanez | 441/80 |
| 5,377,623 | | 1/1995 | Parr | 199/221 |
| 5,406,653 | | 4/1995 | Todor | 4/496 |
| 5,484,313 | * | 1/1996 | Rachel et al. | 441/80 |
| 5,779,511 | * | 7/1998 | Davidson, Jr. | 441/80 |

* cited by examiner

Primary Examiner—Michael J. Carone
Assistant Examiner—James S. Bergin
(74) Attorney, Agent, or Firm—Henderson & Sturm LLP

(57) ABSTRACT

An animal rescue device 10 for suspension from the exterior periphery 102 of the side 101 of a swimming pool 100 wherein the device 10 includes a collapsible framework member 20 adapted to be attached to the swimming pool 100 and having a cross-piece element 21 attached to the upper end 31 of a sheet of netting 30; wherein, the lower end 32 of the sheet of netting 30 is provided with a negative buoyancy unit 13 which maintains the sheet of netting 30 in a vertical orientation relative to the side 101 of the pool 100 to allow an animal to climb out of the pool.

6 Claims, 1 Drawing Sheet

U.S. Patent      Nov. 27, 2001      US 6,321,689 B1
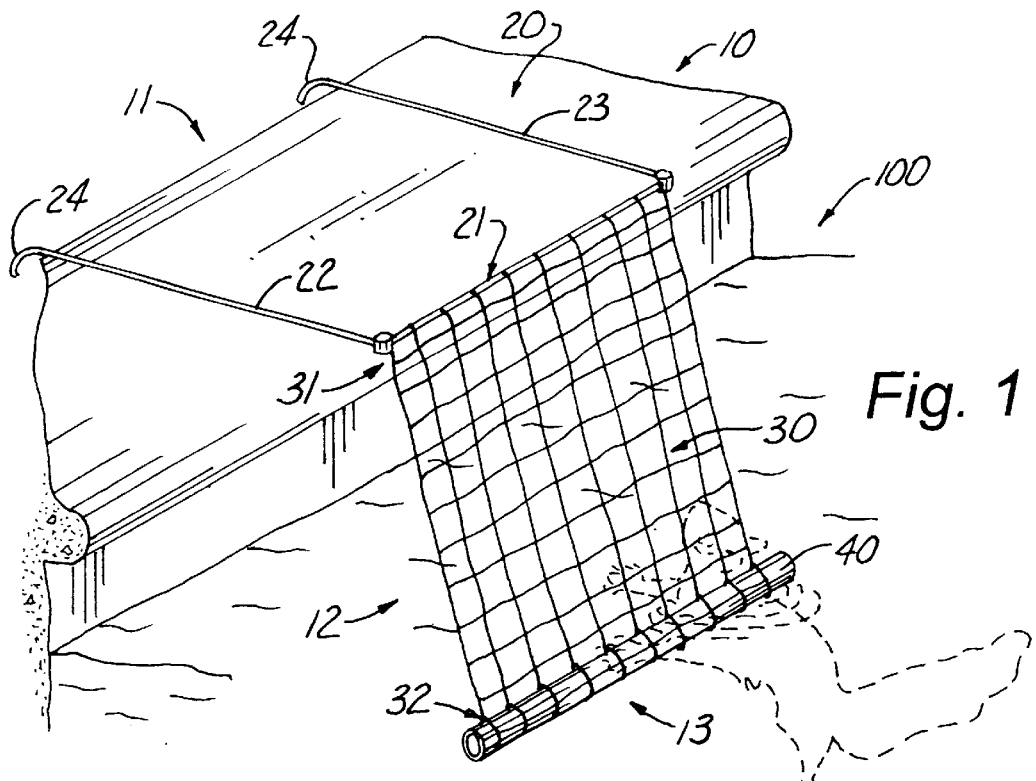
Fig. 1
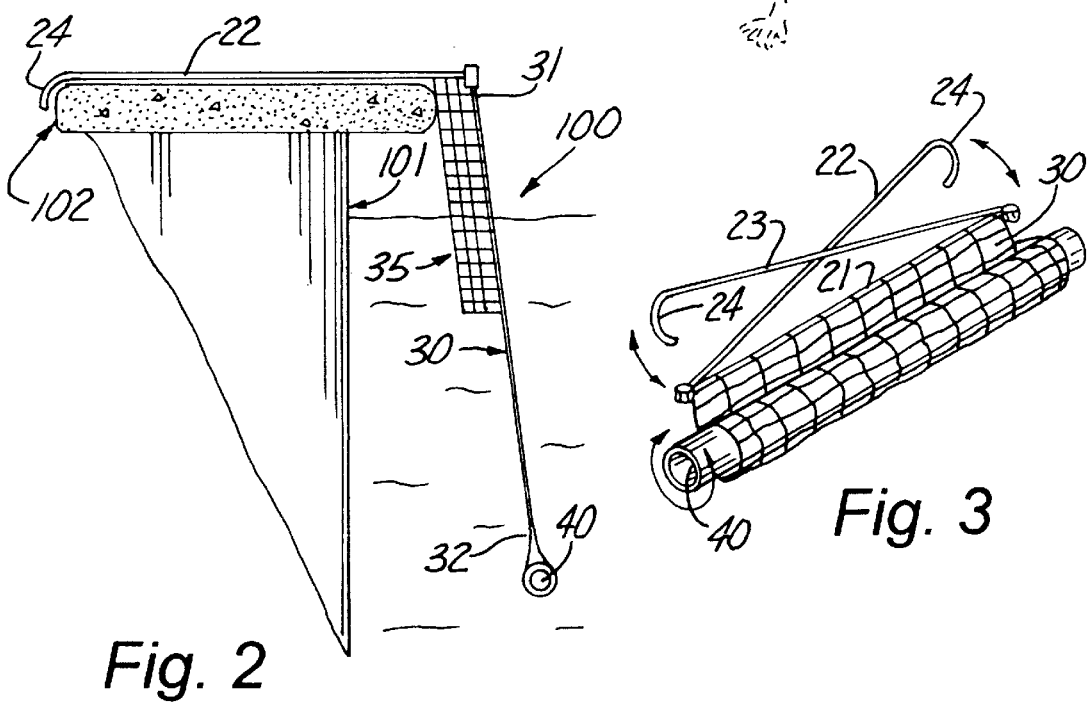
Fig. 2
Fig. 3

ANIMAL RESCUE DEVICE FOR SWIMMING POOLS

BACKGROUND OF THE INVENTION

1. Field of the Invention

The present invention relates to the field of swimming pool accessories, in general, and in particular, to a rescue device to allow animals to escape from a swimming pool.

2. Description of Related Art

As can be seen by reference to the following U.S. Pat. Nos. 5,377,623; 4,658,449; 4,837,869; 4,893,363; and 5,406,653, the prior art is replete with myriad and diverse accessory devices for swimming pools including items that are supported by the side of a swimming pool.

While all of the aforementioned prior art constructions are more than adequate for the basic purpose and function for which they have been specifically designed, they are uniformly deficient with respect to their failure to provide a simple, efficient, and practical swimming pool accessory that is specifically designed to allow small animals to escape from drowning within a pool.

As most pool owners are all too well aware, the water contained within a swimming pool acts as a magnet to attract all types of domestic and wild animals; wherein, a certain percentage will fall into the pool and drown due to the fact that they have no means of climbing up the side of the pool to escape.

As a consequence of the foregoing situation, there has existed a longstanding need for a new and improved type of rescue device for attachment to the side of a swimming pool that will allow small animals to climb out of the pool to escape drowning; and, the provision of such a construction is the stated objective of the present invention.

BRIEF SUMMARY OF THE INVENTION

Briefly stated, the animal rescue device for swimming pools that forms the basis of the present invention comprises in general a framework unit, a net unit suspended from the framework unit, and a negative buoyancy unit.

As will be explained in greater detail further on in the specification, the framework unit includes a collapsible framework member having a cross-piece element provided with a pair of hinged support arms having hooks on their free ends for engaging the external periphery of the side of a swimming pool.

In addition, the net unit comprises a sheet of netting that has an upper end attached to the cross-piece element and a lower end attached to the negative buoyancy unit which in one version of the invention comprises an elongated cylindrical weighted member that will maintain the sheet of netting in a vertical orientation relative to the side of the swimming pool.

In another version of the invention, the sheet of netting is fabricated from a relatively heavy rigid material wherein the weight of the sheet of netting will obviate the need for a separate negative buoyancy unit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the animal rescue device installed on a swimming pool;

FIG. 2 is a side view of the arrangement depicted in FIG. 1; and

FIG. 3 is an isolated perspective view of the rescue device in the collapsed storage mode.

DETAILED DESCRIPTION OF THE INVENTION

As can be seen by reference to the drawings, and in particular to FIG. 1, the animal device that forms the basis of the present invention is designated generally by the reference number 10. The rescue device 10 comprises in general a framework unit 11, a net unit 12, and a negative buoyancy unit 13. These units will now be described in seriatim fashion.

As shown in FIGS. 1 and 2, the framework unit 11 comprises in general a collapsible framework member 20 including a main cross-piece element 21 having two hooked support arms 22, 23 hingedly connected on the opposite ends of the cross-piece element 21; wherein, the free ends of the support arms 22, 23 are provided with hooks 24 for engaging the outer edge 102 of one of the sides 101 of a swimming pool 100.

Still referring to FIGS. 1 and 2, it can be seen that the netting unit 12 comprises a rectangular sheet of flexible netting 30; wherein, the upper end 31 of the sheet of netting 30 is attached to the cross-piece element 21 and the lower end 32 of the sheet of netting 30 is operatively associated with the negative buoyancy unit 13.

As can be seen by reference to FIGS. 1 through 3, the negative buoyancy unit 13 comprises an elongated weighted cylindrical member 40 which is attached to the lower end 32 of the sheet of netting 30 in a substantially vertical orientation during use as illustrated in FIGS. 1 and 2.

In addition, as can best be seen by reference to FIG. 3, the weighted cylindrical member 40 is designed to be rolled up within the sheet of netting 30 and the hinged support arms 22, 23 are designed to be collapsed against the cross-piece element 21 to provide a very compact storage profile when the rescue device 10 is not in use.

At this juncture, it should be noted that while the sheet of netting 30 has been described as being flexible which requires the presence of a negative buoyancy unit 13, this invention also contemplates having the sheet of netting 30 fabricated from a rigid material; wherein, the weight of the rigid material would provide the negative buoyancy necessary to maintain the sheet of netting 30 in a vertical orientation relative to the sides 101 of a swimming pool 100.

As can also be appreciated by reference to FIG. 2, in an alternate version of the preferred embodiment, the support arms 22, 23 may also be provided with netting skirt elements 35 which will prevent the animals from swimming behind the main sheet of netting 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An animal rescue device for a swimming pool having an external periphery surrounding a body of water wherein the device comprises:

a framework unit including a framework member having a cross-piece element with opposite ends;

a netting unit including a sheet of netting material having an upper end attached to said cross-piece element, and having a lower end extending into said body of water;

means for attaching the cross-piece element to the external periphery of the swimming pool; and, means for maintaining the lower end of the sheet of netting in a generally vertical orientation relative to the upper end of the sheet of netting.

2. The device as in claim 1; wherein, said sheet of netting is flexible.

3. The device as in claim 2; further comprising:

a negative buoyancy unit operatively attached to the lower end of the sheet of netting.

4. The device as in claim 3; wherein, the negative buoyancy unit further includes:

an elongated weighted cylindrical member.

5. The device as in claim 4; wherein, the framework unit further comprises:

a pair of hooked support arms wherein each of the hooked support arms are connected on one of the opposite ends of the cross-piece element.

6. The device as in claim 5; wherein, each support arm is hingedly connected on one of the opposite ends of the cross-piece element.

* * * * *